TELEVISION

Filed Jan. 12, 1955 4 Sheets-Sheet 1

INVENTORS
WILLIAM J. SHANAHAN
RICHARD F. VETTER
EDWARD I. SACKS

BY Cushman Darby & Cushman
ATTORNEYS

TELEVISION

Filed Jan. 12, 1955 4 Sheets-Sheet 2

INVENTORS
WILLIAM J. SHANAHAN
RICHARD F. VETTER
EDWARD I. SACKS

BY Cushman, Darby & Cushman
ATTORNEYS

INVENTORS
WILLIAM J. SHANAHAN
RICHARD F. VETTER
EDWARD I. SACKS
BY Cushman, Darby & Cushman
ATTORNEYS INVENTORS
WILLIAM J. SHANAHAN
RICHARD F. VETTER
EDWARD I. SACKS
BY Cushman, Darby & Cushman
ATTORNEYS 2,983,781
Patented May 9, 1961

1

2,983,781

TELEVISION

William J. Shanahan, Richard F. Vetter, and Edward I. Sacks, New York, N.Y., assignors to Skiatron Electronics & Television Corporation, New York, N.Y., a corporation of New York Filed Jan. 12, 1955, Ser. No. 481,425

19 Claims. (Cl. 178—5.1)

This invention pertains to scrambled television systems and transmitting and receiving equipment therefor. The present invention pertains particularly to techniques for heterodyning and otherwise treating the modulation frequency components of video signals so as to place same in different frequency ranges or conditions of attenuation. The present invention embraces the changing from time to time of the manner in which the frequencies are treated, so as to inject the element of scrambling or secrecy. The treatment of video signals according to the present invention may be changed from time to time according to any of the coding techniques set forth in related applications as follows, all assigned to the assignee of the present application: Applications of William J. Shanahan, Serial No. 207,928, filed January 26, 1951, now abandoned, Serial No. 255,555, filed November 9, 1951, now abandoned, Serial No. 316,485, filed October 23, 1952, and application of William J. Shanahan et al., Serial No. 418,642, filed March 25, 1954, and other patents and applications referred to therein.

It is a primary object of the present invention to provide scrambled television systems and components therefor involving changes in frequency characteristic.

It is a further object of the present invention to provide such systems and components for changing from time to time the mode of the frequency characteristic.

It is a further object of the invention to provide such systems wherein part but not all of the range of video signal modulation frequencies are selectively or continuously inverted.

It is a further object of the invention to selectively attenuate certain bands of frequencies.

Further objects and the entire scope of the invention will become more fully apparent from the following description and the appended claims.

The invention may be best understood with reference to the accompanying drawings, wherein.

Figure 1:
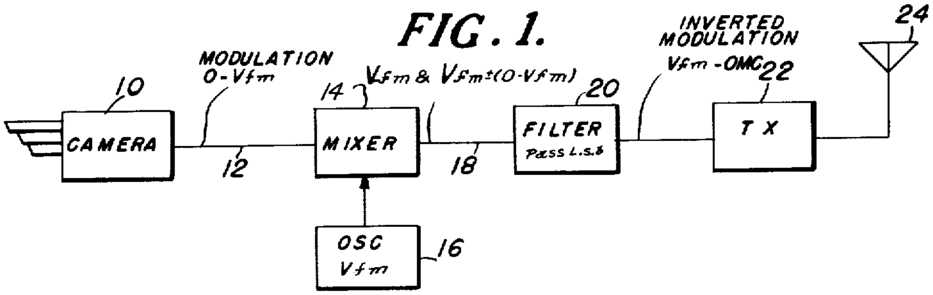
Figure 1 shows a first embodiment of equipment according to this invention.

Now referring to Figure 1, there is shown exemplary apparatus for frequency inverting the video signals for transmission thereof to receiving apparatus. Reference

2 character 10 designates a conventional camera having a possible video signal modulation frequency output ranging from 0 to a maximum video modulation frequency designated $V_{fm}$. The modulation is applied over line 12 to mixer 14. Oscillator 16 provides a steady frequency having a value at least as great as the maximum video modulation $V_{fm}$ which is also applied to the mixer 14. It will be understood by those skilled in the art that a heterodyning action will take place in the mixer 14 and provide an output on line 18 containing three different frequencies, such as $V_{fm}$ and $V_{fm}\pm$ (0 to $V_{fm}$). A filter 20 is provided to remove the upper frequencies and to pass only the lower side band frequencies which in this case would range from $V_{fm}$ down to 0. This range of frequencies is termed herein the inverted modulation and is to be distinguished from the normal modulation range from 0 to $V_{fm}$. The inverted modulation is then applied to the transmitter circuits 22 in the conventional manner and transmitted over antenna 24.

Figure 2:
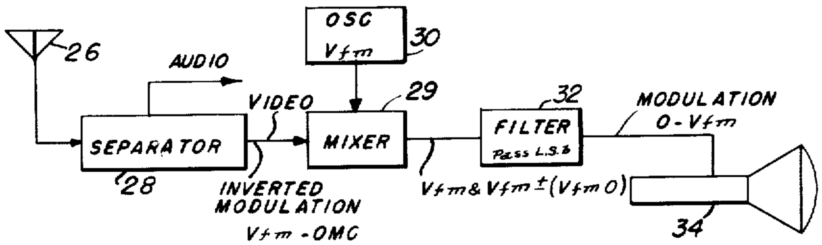
Figure 2 shows receiving equipment for use with the transmitting equipment of Figure 1.

Now referring to Figure 2, the transmitted signals carrying the inverted modulation will be received by the receiving antenna 26 (Fig. 2) after which they will be detected and applied to the conventional television receiver circuits including a separator 28. The video signal less the audio modulation is applied to mixer 29 which also receives a steady frequency of value $V_{fm}$ from oscillator 30. Again, heterodyning action will occur and the three frequencies $V_{fm}$ and $V_{fm}\pm(V_{fm}$ to 0), will be applied to the filter 32. This filter passes only the lower side band and produces a normal video modulation ranging from 0 to $V_{fm}$ frequency which is applied to the display tube 34. The picture on the display tube will then be normal in all respects since the same modulation produced by camera 10 has been applied to the display tube 34.

Figures 3, 4:
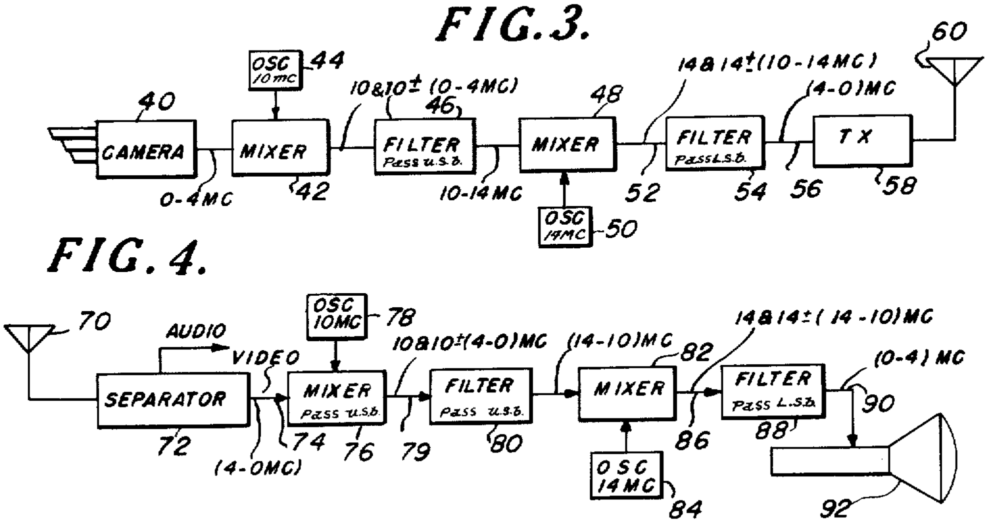
Figure 3 shows transmitting equipment according to a second embodiment of the invention.
Figure 4 shows receiving equipment for use with the transmitting equipment of Figure 3.

In practice, it is impractical to cause inversion of the video modulation by the action of one oscillator having a frequency of the maximum video modulation $V_{fm}$. The difficulty arises in constructing balanced modulators with sufficient accuracy for balancing out both carrier and video signals so that the original and normal video signals will not leak through. To overcome this difficulty, there is provided in accordance with this invention a system as shown in Figures 3 and 4. Again, the camera 40 produces normal video signals which are applied to a mixer 42. At this point, specific examples of inverting oscillator frequencies will be utilized and the inversion is hereinafter caused with respect to four megacycles, but with no intention of limitation thereto. Four megacycles is used since in the present day television standards for the United States four megacycles is the maximum amount of side band modulation which may be transmitted at maximum amplitude. It is recognized that actually 4.5 megacycles modulation may be transmitted for the upper side band; however, the upper .5 megacycle is normally attenuated to zero amplitude at 4.5 megacycles.

The video modulation in mixer 42 is first heterodyned with a frequency such as 10 megacycles from oscillator 44. The output of mixer 42 then is composed of 10 megacycles and two ranges of frequencies including those in the 6 to 10 megacycles band and those in the 10 to 14 megacycles band. These frequencies are all applied to filter 46 which passes only the upper side band (10 to 14 megacycles) which is mixed in mixer 48 with a frequency equal to the highest possible frequency in the upper side band of frequencies. Oscillator 50 thus is set to provide a steady output of 14 megacycles for the heterodyne action in mixer 48. The output on line 52 will comprise 14 megacycles and a range of frequencies from 28 down to 24 megacycles and another range of frequencies from 4 down to 0 megacycles. Filter 54 passes only the lower side band and provides on line 56 the inverted modulation containing frequencies 4 to 0 megacycles which are mixed with the carrier frequency in transmitting circuits 58 and radiated by antenna 60.

The receiver for the transmitting system as described and illustrated in Figure 3 may comprise apparatus as shown in Figure 4. The transmitter carrier containing the inverted modulation is received by antenna 70 and detected by conventional circuits and separated as to video and audio modulations in separator 72. The inverted video modulation then appears on line 74 and is applied to a mixer 76. Preferably, this mixer receives also a steady frequency from oscillator 78 having a frequency value the same as oscillator 44. Therefore, 10 megacycles will be heterodyned with the inverted video in mixer 76 and there will appear on line 79 the oscillator frequency at 10 megacycles and also two ranges of frequencies, namely, 14 to 10 megacycles and 6 to 10 megacycles. These frequencies are all applied to filter 80 which passes only the upper side band and, therefore, allows the frequencies in the range 14 to 10 megacycles to pass to mixer 82. An oscillator 84 provides a steady source of 14 megacycles frequency signals which are mixed in mixer 82 causing heterodyning action to produce on line 86 a frequency of 14 megacycles and the two ranges of frequencies 28 to 24 megacycles and 0 to 4 megacycles. Filter 88 passes only the lower side band of these frequencies and there appears on line 90 the reinverted or normal video signals in the range from 0 to 4 megacycles for application to the display tube 92. It will be understood that the frequencies designated for the oscillators 78 and 84 need not be of those particular values (10 megacycles and 14 megacycles, respectively) but should have a difference frequency equal to the difference frequency between the oscillators 44 and 50 utilized in the transmitting system, shown in Figure 3. Extreme care is necessary to maintain the proper difference frequency between the oscillators 78 and 84 with respect to the difference frequencies of the transmitter oscillators 44 and 50. If any deviation in the difference frequencies between oscillators 78 and 84 occurs, heterodyning action will take place and cause the synchronizing pulses and other lower frequency signals to contain beat notes which may be wholly or partially objectionable.

Figure 5:
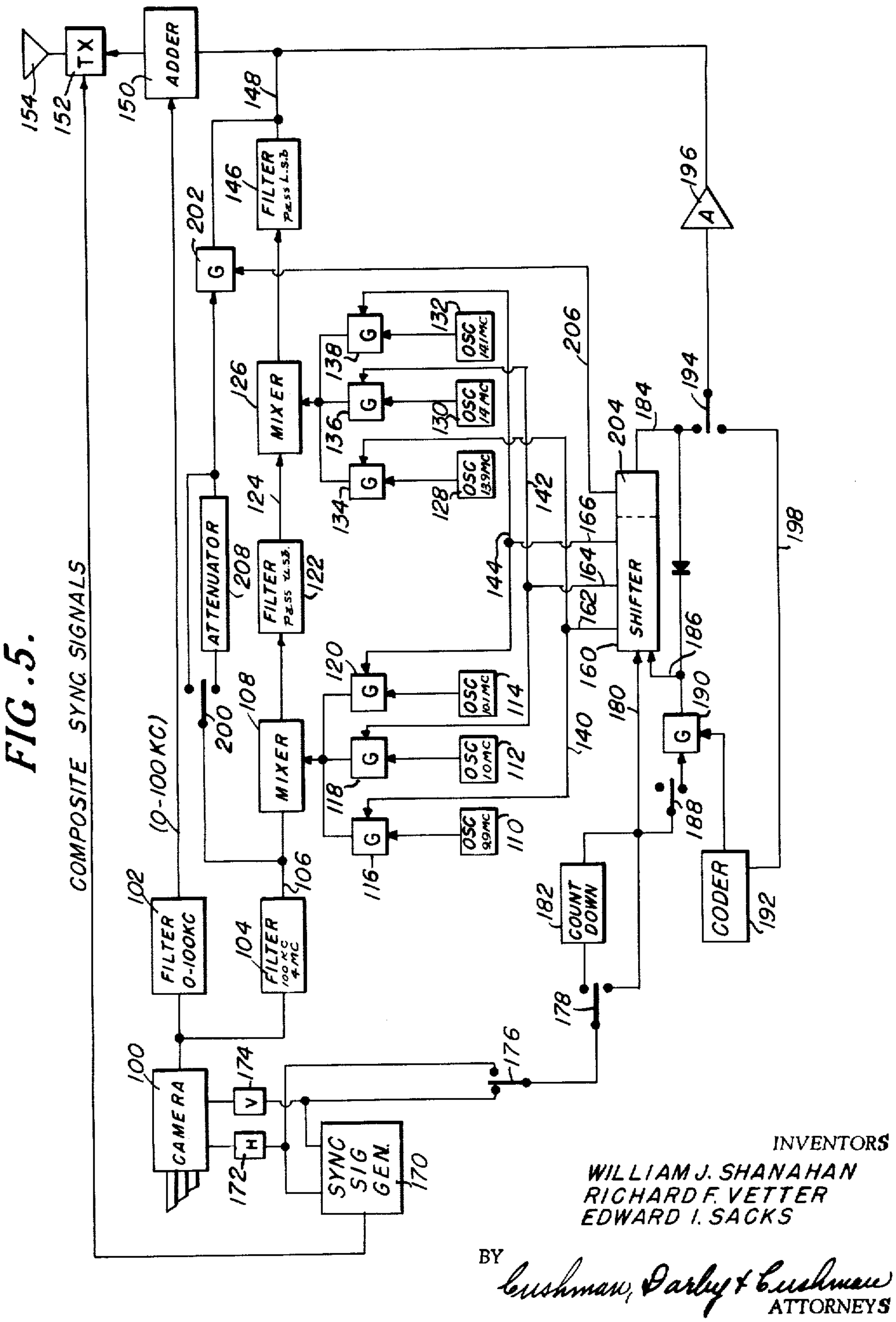
Figure 5 shows a third embodiment of transmitting equipment according to the present invention.
Figure 6:
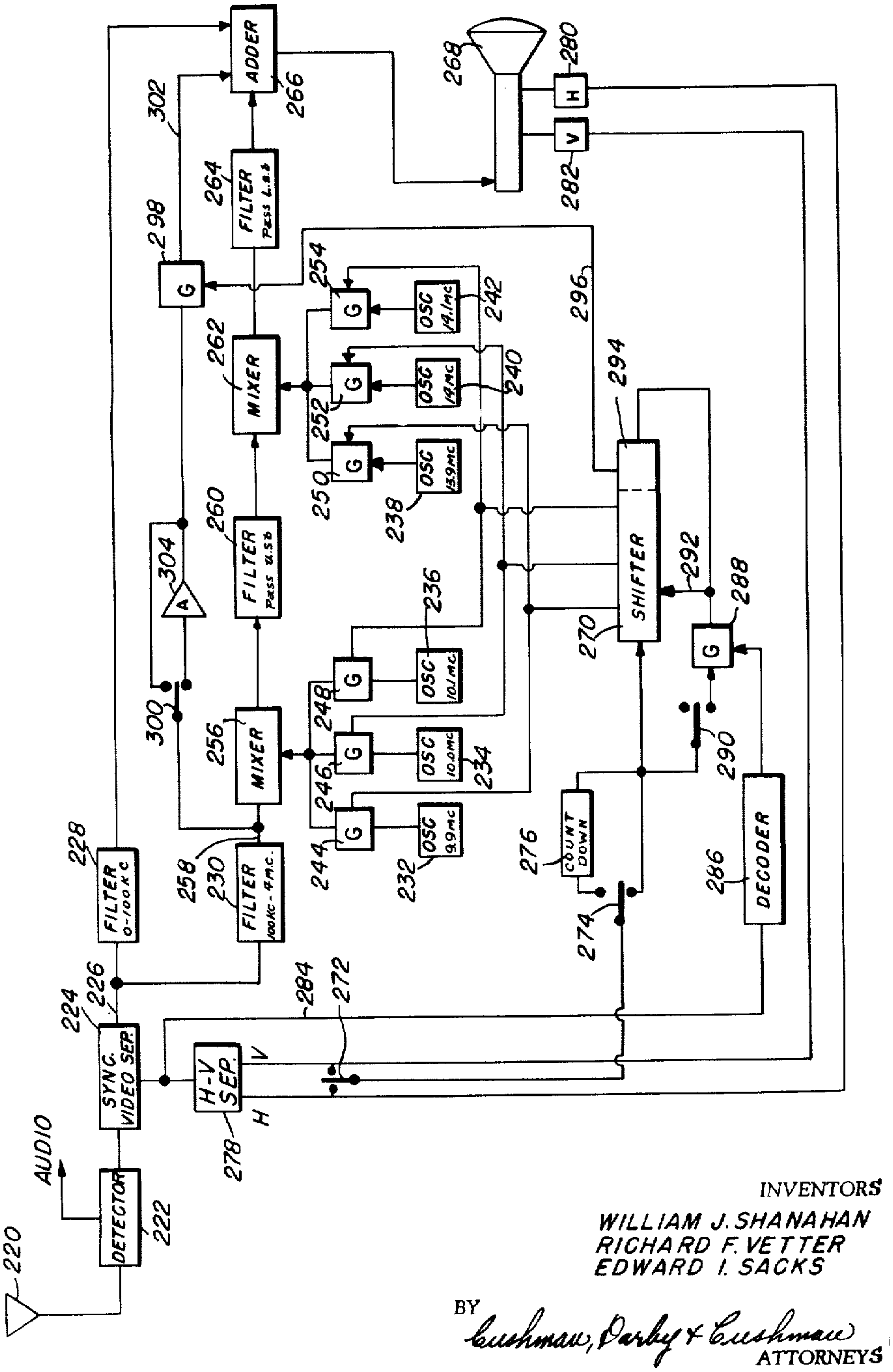
Figure 6 shows receiving equipment for use with the transmitting equipment of Figure 5.

To obviate the undesirable heterodyning action caused by the slight variations in frequency with the lower frequency composite video signals, a partial inversion of the video modulation signals may be desirable. Figures 5 and 6 show respectively transmitter and receiver apparatus for accomplishing this result. The video signals produced by camera 100 may be filtered into two parts by filters 102 and 104. Filter 102 may pass the low frequency video signals such as, for example, 0 to 100 kilocycles, and filter 104 may pass the remaining frequencies from 100 kilocycles to 4 megacycles. The higher range of frequencies appearing on line 106 may then be inverted in the manner shown in Figure 3 with the inverted range being added to the normal low frequency range and transmitted to the receiver in such a mixed form. The receiver then would be the same as shown in Figure 4 except the composite video signals appearing on line 74 of Figure 4 would be separated into two parts so that the inverted modulation only could be reinverted in the same manner as illustrated in Figure 4 before recombining the normal low frequency modulation and the reinverted and consequently normal higher frequency modulation. Figures 5 and 6 illustrate apparatus for so inverting all the video signals except those which are in the lower frequency band, and further illustrates means to change the mode of inversion from time to time.

In Figure 5, the upper frequencies, that is, those in the range of from 100 kilocycles to 4 megacycles, are applied to mixer 108 over line 106. In this embodiment, there are shown three oscillators 110, 112, and 114, each of which provides a steady output of frequencies, for example, of 9.9 megacycles, 10 megacycles, and 10.1 megacycles, respectively. These frequencies are gated to mixer 108 one at a time through gates 116, 118, and 120. Filter 122 passes only the upper side band resulting from the heterodyning action in mixer 108, and consequently, there appears on line 124 one of the following three ranges of frequencies, namely 10 to 13.9 megacycles, 10.1 to 14 megacycles, or 10.2 to 14.1 megacycles, according to whether gate 116, 118, 120, respectively, is enabled. Mixer 126 receives one of these ranges of frequencies and mixes therewith another source of steady frequency from either oscillator 128, 130, and 132 according to whether gate 134, 136, or 138 is enabled. The frequencies produced by oscillators 128—132 must be correlated with the frequencies produced by oscillators 110—114. If oscillator 128 has a frequency of 13.9 megacycles, oscillator 130 has a frequency of 14.0 megacycles, and oscillator 132 has a frequency of 14.1 megacycles, the frequencies of these oscillators will provide a difference frequency of four megacycles with the oscillators 116, 118 and 120, respectively. It will be noted that the two complementary oscillators (that is, oscillators 110 and 128, oscillators 112 and 130, oscillators 114 and 132), have their respective gates (that is, gates 116 and 134, gates 118 and 136, and gates 120 and 138) enabled over common lines 140, 142, and 144, respectively. Therefore mixers 108 and 126 are receiving at any one time steady frequencies which have a constant difference frequency of, as in the given example, 4 megacycles. The output from mixer 126 is filtered in filter 146 which passes only the lower side band of frequencies to line 148. The frequencies on line 148 will then be within the range from four megacycles to 100 kilocycles, that is, will be the inverted modulation with respect to the normal modulation received from filter 104 on line 106 which ranges from 100 kilocycles up to 4 megacycles.. The lower range of frequencies (0 to 100 kilocycles) passed by filter 102 is recombined with the inverted higher range of frequencies in adder 150 and passes to the transmitting circuits 152 for radiation over antenna 154.

In order to change the mode of inversion from time to time, a shifter 160 is provided. Leads 162, 164, 166, have outputs appearing thereon successively and by connections to lines 140, 142, and 144, respectively, enable the gates 116 and 134, 118 and 136, and 120 and 138, respectively, to allow the oscillator frequencies applied to those pair of gates to be introduced into the system and provide the necessary difference frequencies. Co-pending application of W. J. Shanahan, Serial No. 481,423, filed January 12, 1955, assigned to the assignee of the present application, now Patent No. 2,912,486, issued Nov. 10, 1959, describes and illustrates a shifting register in Figure 3 thereof similar to shifter 160 and in Figures 1, 2, 4, and 5 of the last referred to co-pending application, means are illustrated and described for operation of the shifter. Briefly, the conventional synchronizing signal generator 170 is employed not only for generating horizontal and vertical driving pulses to drive the camera 100 through line and frame sweep oscillators 172 and 174, respectively, but also to provide the same horizontal and vertical driving pulses for application through switches 176 and 178 to shifter 160. Each successive pulse arriving on line 180 serves to remove a signal from one of the output lines 162, 164, 166 and place a signal upon another one of these output lines. Switch 176 provides utilization of either the horizontal or vertical driving pulses and switch 178 allows either direct application of these pulses to shifter 160 or a submultiple of these pulses as produced by a count down circuit 182 to be applied to the shifter 160. The shifter may be reset in any of the methods as provided in co-pending application Serial No. 481,423. Line 184 may attach to the end output section of the shifter and be connected back to the first section of the shifter as over line 186 to continue the cycling process. Under these conditions, a switch 188 would be in its upper or open position. As is also explained in co-pending application Serial No. 481,423, it may be desired to transmit a random or coded reset signal. If so, switch 188 may be moved to the downward position to provide the pulses arriving at switches 178 to a gate 190. A coding system as fully explained in said co-pending application, Serial No. 481,423, may be employed in coding circuit 192 for enabling gate 190 for allowing a randomly selected one of the normally recurring pulses at switch 188 to pass through gate 190 and line 186. In this manner, the reset time of the shifter 160 may be randomly and selectively varied (line by line, field by field, etc.) to cause a complicated and thoroughly scrambled televised video signal. The reset signal on line 184 may be applied through switch 194 and made distinctive from any of the synchronizing pulses or other transmitted signals in some particular manner, such as by amplification in amplifier 196. The resultant signal may then be mixed with the audio modulation in audio equipment (not shown) and transmitted over the audio channel, or mixed in the adder 150 and transmitted over the video channel via antenna 154. When the shifter 160 is being reset by a coded signal from circuit 192 switch 194 is in its downward position so that a modified or distinctive signal or combination of signals as produced by coder 192 is conducted over line 198 and through switch 194 for transmission to the receivers. Above mentioned co-pending application, Serial No. 481,423, illustrates apparatus such as coder 192 and provides means for transmitting a distinctive signal in the audio system. The above mentioned co-pending application, Serial No. 255,555, filed November 9, 1951, shows another method of transmitting a distinctive signal in the form of an elongated vertical pulse, while above mentioned co-pending application, Serial No. 316,485, filed October 23, 1952, and Serial No. 418,642, filed March 25, 1954, illustrate means to transmit a binary combination of distinctive signals for coding purposes. Any of these methods may be utilized for transmission of the resetting signal and no limitation is intended by the illustration of the particular apparatus shown in Figure 5.

While in Figures 5 and 6 the selective enabling of gates for changing the inputs to mixers 108 and 126 (Figure 5) and mixers 256 and 262 (Figure 6) has been and will be explained in terms of the use of a commutation means at the transmitter and receiver, there is no intention to exclude the use of scrambled television techniques as explained in co-pending applications of William J. Shanahan, Serial No. 316,485, filed October 23, 1952, and Serial No. 418,642, filed March 25, 1954, both assigned to the assignee of the present application, for selectively operating the circuits of Figures 5 and 6. In general, the just mentioned applications describe techniques for utilizing transmitted code signals without use of commutation means as such for mode selection at the transmitting end and mode resolution at the receiving end.

Continuing to refer to Figure 5, as a further means of changing the mode of the signal of the mobile transmission, the inverted modulation of a predetermined range may be mixed from time to time with normal video modulation of the same frequency range. To accomplish this, the signals on line 106 ranging from 100 kilocycles to 4 megacycles are applied through the upper contact of switch 200 to gate 202. Shifter 160 may have another section 204 with another output over line 206 for enablement of gate 202. In this manner, assuming there are only four output lines from shifter 160, every fourth pulse applied to line 180 will interleave normal video modulation in the range 100 kilocycles to 4 megacycles on line 148 with the three modes of inverted video modulation in the same frequency range. To further complicate the composite transmitted video signal, attenuator 208 may be included in the higher normal video line by moving switch 200 to its lower position, thereby making the normal video appearing on line 148 of an amplitude insufficient to produce desirable definition when detected and received.

Figure 6 provides receiving apparatus for inverting the scrambled television signal from the apparatus of Figure 5 back into a usable signal. The video signal as received on antenna 220, detected in detector 222 and separated from the synchronizing signals in separator 224 is applied over line 226 to filters 228 and 230. Filter 228 corresponds in frequency range to filter 102 of Figure 5 and as described will pass frequencies ranging from 0 to 100 kilocycles. Correspondingly, filter 230 will pass the remaining frequencies (100 kilocycles to 4 megacycles.) The oscillators 232, 234, and 236 each provide a discrete steady frequency and oscillators 238, 240, and 242 provide a steady frequency each of which differs from the other and each of which has a common difference frequency with respect to one of the oscillators 232, 234, and 236. The output of each of the oscillators 232—242 is gated by gates 244, 246, 248, 250, 252 and 254 in the same manner as described for the corresponding components in Figure 5. The output from one of the gates 244, 246, and 248 is heterodyned in mixer 256 with the normal video modulation frequencies in the range from 100 kilocycles to 4 megacycles appearing on the line 258. Filter 260 passes only the resultant upper side band of the heterodyned frequencies and mixer 262 heterodynes the upper side band with one of the frequencies from oscillators 238, 240 and 242. The resultant lower side band of the heterodyning action is passed by filter 264 and applied to adder 266 for a recombination with the normal video modulation signals emanating from filter 228. In this manner, the reinverted video as combined with the normal low frequency is applied to the picture tube 268 for presentation of an unscrambled picture. The gates 244—254 are enabled in pairs by a shifter 270 in the same manner as their corresponding gates in Figure 5 were enabled by shifter 160 of Figure 5. Shifter 270 may be energized in the same manner as previously described for shifter 160 to reproduce the proper mode of modulation. Switches 272 and 274 necessarily correspond in position to their respective switches of Figure 5. That is, when switch 176 (Figure 5) is connected to vertical pulses, switch 272 (Figure 6) would be connected to vertical pulses and, when switch 178 (Figure 5) is connected through count down circuit 182, switch 274 (Figure 6) would be connected through count down circuit 276.

It will be understood that the local oscillator in the transmitter and in the receiver may be individually or collectively stabilized in frequency by any of the conventional means well known to those skilled in the art. Also the receiver local oscillators may be stabilized and held to their proper difference frequencies by the transmittal of definite frequency synchronizing pulses.

The usual synchronization signals separated from the video signals in separator 224 are further separated into horizontal and vertical signals in separator 278. The resultant horizontal and vertical driving pulses are applied to horizontal and vertical sweep oscillators 280 and 282, respectively, for sweeping the video modulation in picture tube 268.

To complete the example of operation of shifters 160 and 270, the synchronization signals including the transmitted distinct reset signals as removed by separator 224 are applied over line 284 to decoder 286. The distinctive reset signal or signals are translated within decoder 286 to provide a reset enabling pulse through gate 288 so that one of the normally continually recurring pulses from switch 290 may pass through gate 288 to reset over line 292 the shifter 270 in synchronization with the resetting of the transmitter shifter 160 (Figure 5). When switch 290 is in its upper position a reset signal may be applied to the shifter 270 (Figure 6) over line 292 by the connection thereto of a signal occurring when the last unit within the shifter is energized and a recycling of the shifter 270 is necessary.

As for the shifter 160 (Figure 5) and its additional section 204, there is provided in Figure 6 an equivalent additional section 294 in shifter 270. Section 294 may have an output over line 296 to enable gate 298. When this gate is enabled and switch 300 is in its upper position normal video signals having frequencies in the range from 100 kilocycles to four megacycles may be interleaved with the inverted video signals in the same range by application of the normal video signals passing gate 298 from switch 300 to line 302 and into adder 266. If attenuated normal video signals are utilized in the transmitter as by having switch 200 (Fig. 5) in its downward position, switch 300 (Fig. 6) may be in its downward position so that the normal video signals may pass through amplifier 304 to increase their amplitude to an amplitude equivalent to the reinverted signals appearing from filter 264.

Figure 7:
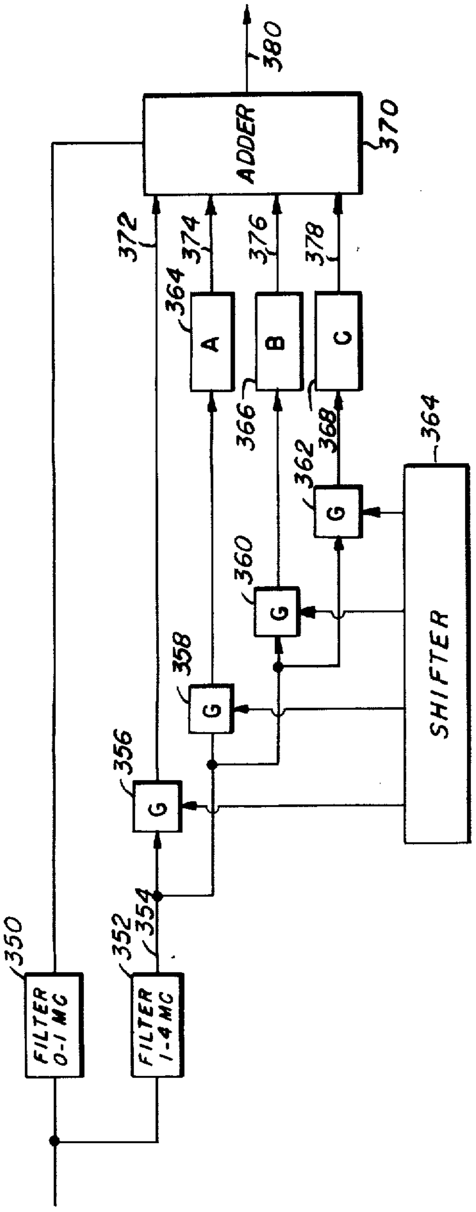
Figure 7 shows a further embodiment of frequency treating circuitry for use equally in transmitting or receiving equipment according to other of the embodiments of the invention.
Figure 8:
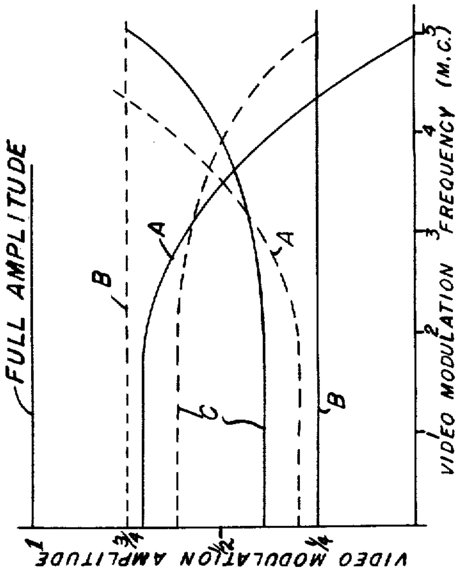
Figure 8 represents certain relationships pertaining to the equipment of Figure 7.

As an alternative embodiment, several attenuators may be utilized, each having different characteristics. Apparatus exemplary of this embodiment is illustrated in Figure 7. The normal video modulation signals are filtered in filters 350 and 352 as previously described for Figures 5 and 6. However, this embodiment allows filtering of a range of frequencies for the low range of from 0 to 1 megacycles, and the other filter 352 passes the remaining band of frequencies such as from one to four megacycles. The higher frequencies appearing on line 354 are applied simultaneously through gates 356, 358, 360, and 362. Each of these gates may be enabled successively by a shifter 364 which may take the form of the shifter 160 (Fig. 5) or 270 (Fig. 6). When signals are allowed to pass any one of the gates 358—362 the signals are applied respectively to circuits A, B, and C further designated by character numbers 364, 366, and 368. In the transmitter, blocks A, B, and C would be attenuators, and in receivers utilizing this type mode, blocks A, B, and C would be amplifiers. The receiver amplifiers have a frequency and amplitude characteristic complementary to their corresponding transmitter attenuators; for example, the characteristic of attenuator A might be such as shown in Figure 8 in solid line A and the amplifier complementary characteristic would be the dash line marked A. The complementary frequency characteristics for the attenuator B and amplifier B are shown respectively by solid and dash lines marked B in Figure 8 and in the same manner the characteristics for attenuator and amplifier C are so designated. The adder unit 370 combines the output from filter 350 and the unattenuated output from gate 356 plus the attenuator outputs from blocks 364, 366 and 368. It will be understood that there will be only one output on lines 372, 374 and 376 and 378 at a time. The combined output of adder 370 on line 380 may be applied, in the transmitter, to the transmitting circuits antenna as shown in Figure 5. In the receiver, as previously mentioned, the outputs from gates 358—362 are applied to amplifiers 364—368 to amplify in a complementary frequency characteristic manner the signals applied thereto. In the receiver then the outputs on lines 372—378, only one of which appears at a time, is mixed in adder 370 with the output from filter 350 to provide a composite normal video signal on line 380 which may be applied to a display tube such as picture tube 268 shown in Figure 6.

The apparatus of Figure 7 in its appropriate attenuation and amplifying modes may be employed in conjunction with the frequency inversion system of Figures 5 and 6, or without same. That is, when the A, B, and C circuits are attenuators, Figure 7 may be substituted for the Figure 5 circuitry between camera 100, output of adder 150, and inputs to shifter 204. On the other hand, Figure 7 when circuits A, B, and C are attenuators, may replace Figure 5 circuitry only to the extent of switch 200, attenuator 208 and gate 202 along with adder 150, it being understood that in such case adder 370 of Figure 7 would have another input to receive the combined signals on line 148 and from amplifier 196 in Figure 5, while only either the filters 102, 104 of Figure 5 or filters 350, 352 of Figure 7 are employed. In like manner, when the A, B, and C circuits of Figure 7 are amplifiers, Figure 7 may be utilized in combination with the frequency re-inverting system of Figure 6 or instead thereof to effect unscrambling of signals coded by a complementary attenuating equipment.

The foregoing detailed descriptions have been given only for purposes of explanation and the true scope of the invention is to be determined from the appended claims.

What is claimed is:

1. A scrambled television transmitting station comprising means for generating video signals having a predetermined range of modulation frequency components, means for generating at least one local oscillation, first heterodyning means coupled to both of the aforementioned means for heterodyning said video signals and local oscillations to produce a set of upper and lower frequency sidebands, filter means coupled to said heterodyning means for passing only one of said side bands a source of local oscillations differing in frequency than the said one local oscillation, second heterodyning means coupled to said filter means and source for heterodyning the output signals from the filter means with the signals from said source to produce a second set of upper and lower sidebands, second filter means connected to said second heterodyning means for passing only the sideband of said second set opposite to that passed by said first mentioned filter means, and means connected to the second filter means for transmitting the sideband passed thereby as video modulation on a carrier frequency whereby the transmitted video modulation frequency components are frequency inverted.

2. A transmitting station as in claim 1 and further including at least one video signal path having a given attenuation characteristic for attenuating video signals to an amplitude always greater than zero, gating means serially coupled to said path, means connecting the serially coupled path and gating means between said video signal generating means and said transmitting means, a set of second gating means one for the local oscillation generating means and another for said source, means connecting the respective gating means of said set thereof respectively between the local oscillation generating means and said first heterodyning means and between said source and second heterodyning means, means for mutually exclusively enabling the first mentioned gating means and said set of gating means, and means connecting the enabling means to each of said gating means.

3. A transmitting station as in claim 1 including additional filter means for passing only a predetermined part of the possible video modulation component frequencies, and means coupling the additional filter means between the video signal generating means and the first mentioned heterodyning means.

4. A transmitting station as in claim 1 and further including at least one additional means for generating a local oscillation at a frequency different from that of the first mentioned local oscillation and from the local oscillation of said source, a first set of gating means respectively coupling the local oscillation generating means to said first heterodyning means for allowing the local oscillations of the respective local oscillation generating means to be delivered mutually exclusively to the first heterodyning means, at least one additional source of local oscillations operating at a frequency different from the frequency of any aforementioned local oscillation, a second set of gating means respectively coupling the said local oscillation sources to said second heterodyning means for allowing the local oscillations of the respective sources to be delivered mutually exclusively to the second heterodyning means, and means connected to said first and second sets of gating means for successively enabling different pairs of gating means one from each set.

5. A transmitting station as in claim 4 and further including means coupled to the video signal generating means, the transmitting means, and the enabling means for conveying at least a part of the generated video signals to said transmitting means when enabled to the exclusion of any of said gating means by said enabling means.

6. A transmitting station as in claim 5 wherein the conveying means includes at least one attenuator and gate serially coupled together and between the video signal generating means and transmitting means with the gate being further coupled to said enabling means.

7. A transmitting station as in claim 5 wherein the conveying means includes a plurality of sets of serially coupled attenuators and gates with the sets coupled in parallel between the video signal generating means and the transmitting means, each attenuator having a different attenuation characteristic, means coupling each gate to the enabling means for mutual exclusive enablement by the enabling means relative to each other and to any gating means in the said first and second sets thereof.

8. A scrambled television transmitting station comprising means for generating video signals having at least a predetermined range of modulation frequency components, video signal transmission means, at least two parallel paths jointly coupling said generating and transmission means together, each path having a different attenuation characteristic for causing all the video signals received by said paths to be attenuated differing amounts but only to respective amplitudes which are always greater than zero, means for operatively connecting said paths mutually exclusively to said transmission means, and means connecting the operatively connecting means to said paths.

9. A transmitting station as in claim 8 and further including signal adder means, filter means coupled between the video signal generating means and said adder means for passing a first part of said range of the video signal modulation frequency components directly to said adder means, second filter means coupling the video signal generating means to said paths for passing thereto another part of said range, and means connecting the adder means to said transmission means.

10. A television receiver for detecting and unscrambling signals transmitted from a scrambling type television transmitting station comprising means for detecting video signals having a predetermined inverted range of modulation frequency components, means for generating a local oscillation, first heterodyning means coupled to both of the aforementioned means for heterodyning said video and locally generated oscillations to produce a set of upper and lower frequency sidebands, filter means for passing only one of said sidebands, means coupling the heterodyning means to the filter means, a source of local oscillations differing in frequency than the said one local oscillation, second heterodyning means coupled to said filter means and source for heterodyning the output signals from the filter means with the signal from said source to produce a second set of upper and lower sidebands, second filter means connected to said second heterodyning means for passing only the sideband of said second set opposite to that passed by said first mentioned filter means, display means, and means connecting the output of said second filter means to the display means, whereby the predetermined inverted range of modulation frequency components is re-inverted.

11. A television receiver as in claim 10 and further including at least one path having a given amplification characteristic, gating means serially coupled to said path, means connecting the serially coupled path and gating means between said detecting means and display means, a set of two gating means, means coupling said two gating means respectively between the local oscillation generating means and its associated heterodyning means and between said local oscillation source and the second heterodyning means, means for mutually exclusively operating the first mentioned gating means and the set of two gating means, and means connecting the enabling means to each of said gating means.

12. A television receiver as in claim 10 and further including at least one additional means for generating a local oscillation at a frequency different from that of the first mentioned local oscillation and from the local oscillation of said source, a first set of gating means respectively coupling the local oscillation generating means to said first heterodyning means for allowing the local oscillations of the respective local oscillation generating means to be delivered mutually exclusively to the first heterodyning means, at least one additional source of local oscillations operating at a frequency different from the frequency of any aforementioned local oscillation, a second set of gating means respectively coupling the said local oscillation source to said second heterodyning means for allowing the local oscillations of the respective sources to be delivered mutually exclusively to the second heterodyning means, and means connected to said first and second sets of gating means for successively enabling different pairs of gating means one from each set.

13. A television receiver as in claim 12 and further including means coupled to the video signal detecting means, the display means and the enabling means for conveying at least a part of the detected video signals to said display means when enabled to the exclusion of any of said gating means by said enabling means.

14. A television receiver as in claim 13 wherein the conveying means includes at least one amplifier and gate serially coupled together and between the video signal generating means and transmitting means with the gate being further coupled to said enabling means.

15. A television receiver as in claim 13 wherein the conveying means includes a plurality of sets of serially coupled amplifiers and gates with the sets being coupled in parallel between the video signal detecting means and the display means, each amplifier having a different amplification characteristic, means coupling each gate to the enabling means for mutual exclusive enablement by the enabling means relative to each other and to any gating means in said first and second sets thereof.

16. A scrambled television receiving station comprising means for detecting video signals having at least a predetermined range of modulation frequency components, video signal display means, at least two parallel paths jointly coupling said detecting and display means together, each path having a different amplification characteristic for causing all the video signals received by said paths to be amplified differing amounts, means for operatively connecting said paths mutually exclusively to said display means, and means connecting the operatively connecting means to said paths.

17. A receiving station as in claim 16 and further including signal adder means, filter means coupled between the video signal detection means and said adder means for passing a first part of said range of the video signal modulation frequency components directly to said adder means, second filter means coupling the video signal detecting means to said paths for passing thereto another part of said range, and means connecting the adder means to said transmission means.

18. A scrambled television system comprising: a transmitter including means for developing picture signals, means for attenuating at least a part of the frequency range of said signals to an amplitude always above zero in accordance with a first attenuation characteristic, means for attenuating said part to an amplitude always above zero but in accordance with a second and different attenuation characteristic, and means for causing transmission of the picture signals attenuated in accordance with said first characteristic and those attenuated in accordance with said second characteristic at different times; and at least one receiver including means for amplifying the so transmitted picture signals complementarily to their respective attenuation characteristic.

19. Apparatus for use either as a scrambling or unscrambling means in a scrambled television system comprising means for generating at least one local oscillation, first heterodyning means coupled to said generating means for receiving at least a predetermined range of video signal modulation frequency components and heterodyning same with said local oscillation to produce a set of upper and lower frequency sidebands, filter means for passing only one of said sidebands, means coupling the heterodyning means to the filter means, a source of local oscillations differing in frequency than the said one local oscillation, second heterodyning means coupled to said filter means and source for heterodyning the output signals from the filter means with those from said source to produce a second set of upper and lower sidebands, and second filter means connected to said second heterodyning means for passing only the sideband of said second set opposite to that passed by said first mentioned filter means, the output of said second filter means being a range of modulation frequency components which is frequency inverted relative to said predetermined range.

References Cited in the file of this patent

UNITED STATES PATENTS

| | | |
|---|---|---|
| 1,784,891 | Dean et al. | Dec. 16, 1930 |
| 2,372,344 | Sprague | Mar. 27, 1945 |
| 2,414,101 | Hogan et al. | Jan. 14, 1947 |
| 2,510,046 | Ellett et al. | May 30, 1950 |
| 2,567,539 | Aram | Sept. 11, 1951 |
| 2,664,460 | Roschke | Dec. 29, 1953 |
| 2,691,061 | Crotty | Oct. 5, 1954 |
| 2,697,741 | Roschke | Dec. 21, 1954 |